(12) United States Patent
Wang et al.

(10) Patent No.: US 8,850,228 B2
(45) Date of Patent: Sep. 30, 2014

(54) COMPUTING DEVICE AND METHOD FOR CONTROLLING ACCESS TO DRIVER PROGRAMS

(75) Inventors: Guang-Jian Wang, Shenzhen (CN); Jin-Rong Zhao, Shenzhen (CN); Xiao-Mei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/449,295

(22) Filed: Apr. 17, 2012

(65) Prior Publication Data

US 2012/0297203 A1 Nov. 22, 2012

(30) Foreign Application Priority Data

May 19, 2011 (CN) .......................... 2011 1 0131713

(51) Int. Cl.
*H04L 29/00* (2006.01)
*G06F 12/14* (2006.01)
*G06F 21/60* (2013.01)

(52) U.S. Cl.
CPC ................ *G06F 21/60* (2013.01); *G06F 12/14* (2013.01)
USPC ......................................... 713/190; 713/150

(58) Field of Classification Search
CPC .......... G06F 21/22; G06F 12/14; G06F 21/60
USPC ......................................................... 713/150
See application file for complete search history.

(56) References Cited

U.S. PATENT DOCUMENTS

2012/0311317 A1* 12/2012 Elrod et al. ................... 713/150

OTHER PUBLICATIONS

/Jinxin Ma, Zhoujun Li, Jia Li/ A Novel Secure Virtual Storage Device Scheme/Oct. 2010/ IEEE Xplore/ pp. 271-275.*

* cited by examiner

*Primary Examiner* — Brandon Hoffman
*Assistant Examiner* — Michael D Anderson
(74) *Attorney, Agent, or Firm* — Novak Druce Connolly Bove + Quigg LLP

(57) ABSTRACT

A computing device and a method for controlling access to driver programs obtains a first system time at the time that an application uses a CTL_CODE to access a driver program. The first system time and the CTL_CODE is encrypted to generate an encrypted CTL_CODE which is then sent to the driver program. The encrypted CTL_CODE is decrypted to obtain the first system time and the CTL_CODE therein. A second system time at the time that the driver program receives the encrypted CTL_CODE is obtained and compared with the first system time. Access to the driver program is allowed if a difference between the first system time and the second system time falls within a predetermined range, and access to the driver program is forbidden if the difference is beyond the predetermined range.

18 Claims, 3 Drawing Sheets

COMPUTING DEVICE AND METHOD FOR CONTROLLING ACCESS TO DRIVER PROGRAMS

BACKGROUND

1. Technical Field

Embodiments of the present disclosure relate to access control technology, and more particularly to a computing device and a method for controlling access to driver programs.

2. Description of Related Art

Driver programs are computer programs that allow applications or operating systems (OS) to interact with hardware devices by acting as translators between the hardware devices and the applications or the operating systems. Driver programs run in a kernel space of the OS, and applications that run in a user space of the OS may access the driver programs using input/output control (IOCtl) system call. The IOCtl system call uses a unique control code (CTL_CODE) that specifies a function request. For example, a CD-ROM device driver program instructs a physical device to eject a disc by being provided with an IOCtl CTL_CODE.

The IOCtl CTL_CODEs are provided to applications that are authorized to access a driver program. However, a hacker may intercept the IOCtl CTL_CODES by Dynamic Link Library (DLL) injection, causing unauthorized applications to access the driver program.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
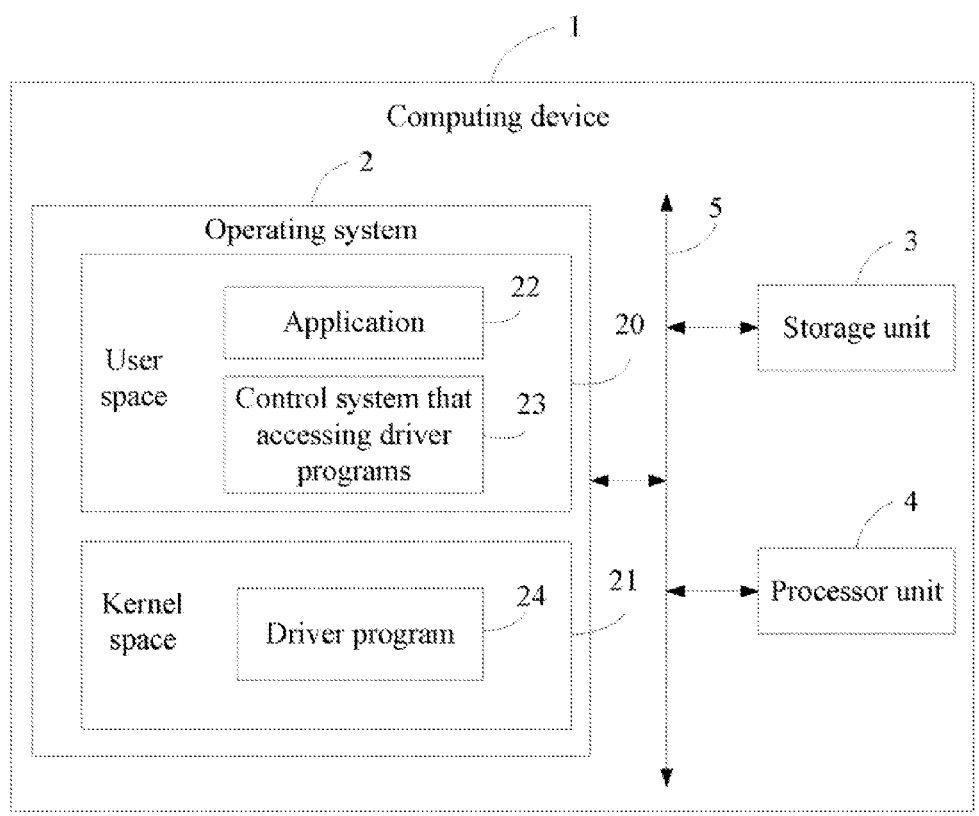
FIG. 1 is a block diagram of one embodiment of a computing device including a control system of accessing driver programs.

FIG. 1 is a block diagram of one embodiment of a computing device 1. The computing device 1 is installed with an operating system (OS) 2, such as ANDRIOD, BSD, IOS, LINU, MAC OS X, MICROSOFT WINDOWS, WINDOWS PHONE, or Z/OS, for example. The OS 2 includes user space 20, in which one or more applications, such as an application 22 is running, and further includes kernel space 21, in which one or more driver programs, such as a driver program 24, are running. The application 22 may be the INTERNET EXPLORER, or a multimedia player, for example.

The computing device 1 further includes a control system that accessing driver programs (hereinafter, the control system) 23. The control system 23 may run in the user space 20 of the OS 2, and include a plurality of function modules which can control access to the driver program 24, enable authorized applications, such as the application 22, to be allowed to access the driver program 24, and unauthorized applications to be forbidden to access the driver program 24.

The computing device 1 further includes a storage unit 3 and a processor unit 4, both of which communicate with the one or more driver programs in the kernel space 21 through the computer bus 5.

The storage unit 3 may include any type(s) of non-transitory computer-readable storage medium, such as a hard disk drive, a compact disc, a digital video disc, or a tape drive. The storage unit 3 stores computerized code of the function modules of the control system 23.

The processor unit 4 may include a processor, a microprocessor, an application-specific integrated circuit (ASIC), and a field programmable gate array (FPGA), for example. The processing unit 4 may execute the computerized code of the function modules of the control system 23 to realize the functions of the control system 23.

Figure 2:
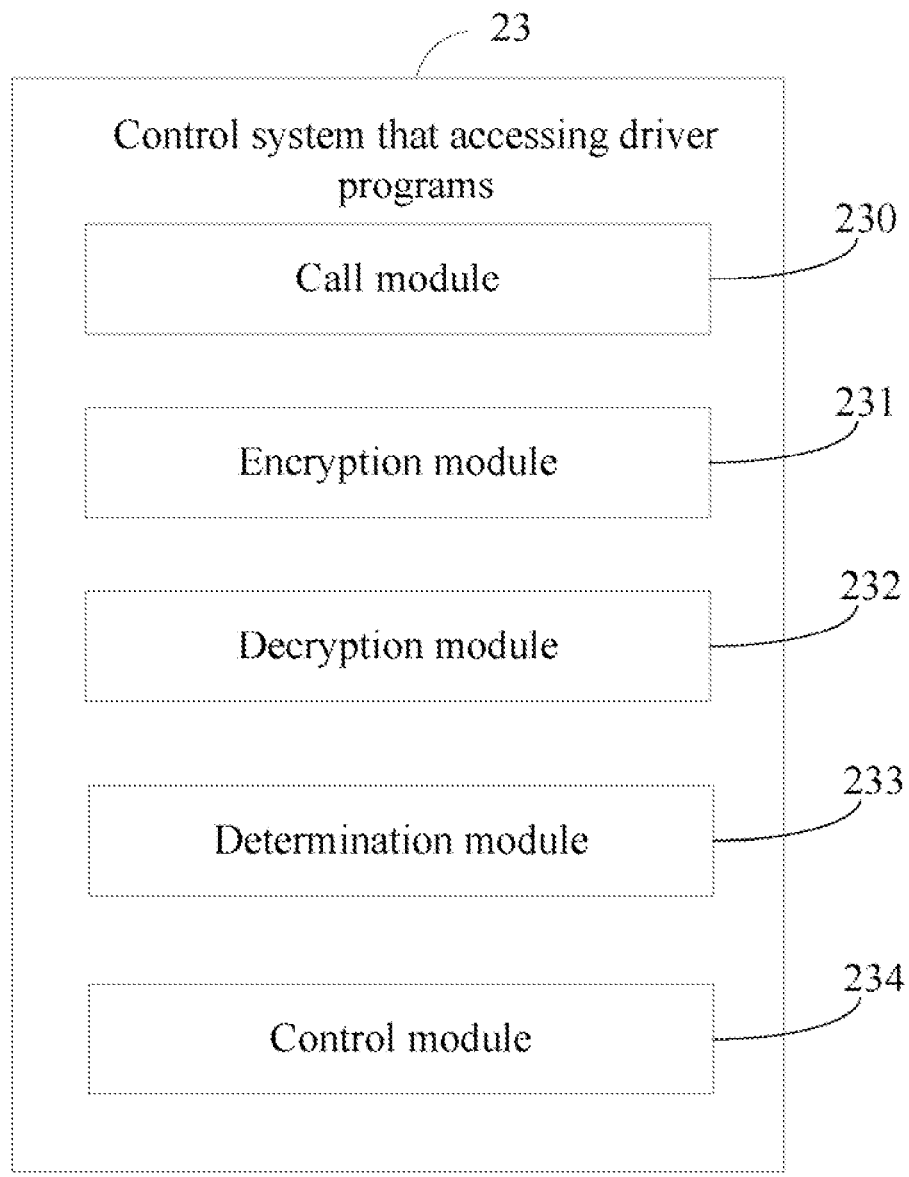
FIG. 2 is a block diagram of one embodiment of function modules of the control system in FIG. 1.

FIG. 2 is a block diagram of one embodiment of the function modules of the control system 23. In one embodiment, the control system 23 may include a call module 230, an encryption module 231, a decryption module 232, a determination module 233, and a control module 234. The function modules 230-234 provide the functions illustrated in FIG. 3.

Figure 3:
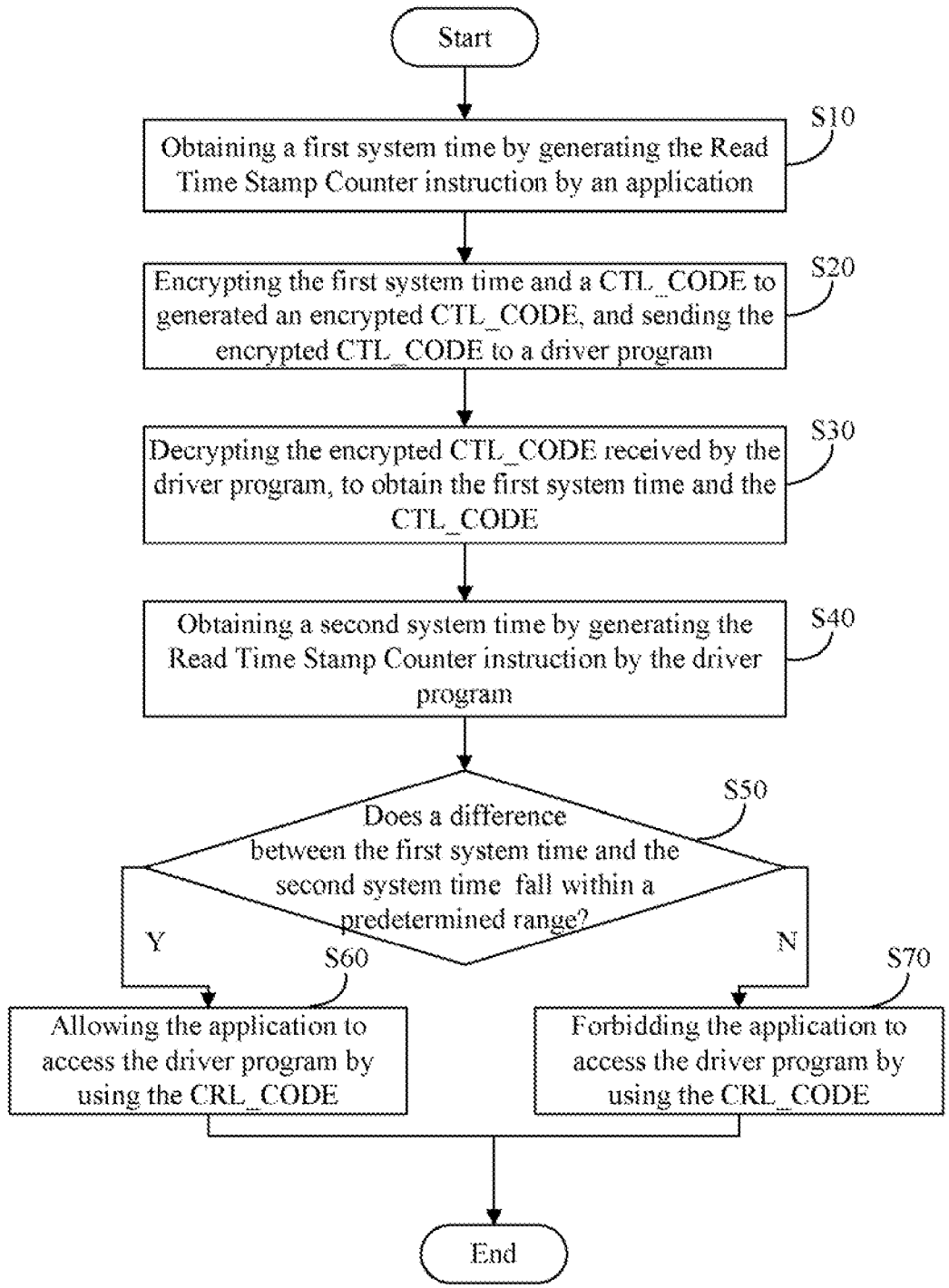
FIG. 3 is a flowchart of one embodiment of a method for controlling access to driver programs.

FIG. 3 is a flowchart of one embodiment of a method for controlling access to driver programs. Depending on the embodiment, additional steps may be added, others removed, and the ordering of the steps may be changed.

In step S10, the call module 230 obtains a current system time of the computing device 1 (the first system time, hereinafter) at the time that the application 22 uses a CTL_CODE to access the driver program 24. In one embodiment, the call module 230 calls the application 22 to generate the read time-stamp counter (RDTSC) instruction to obtain the first system time. The time-stamp counter (TSC) is a 64-bit register present on the processor unit 4, which counts the number of cycles since reset. The RDTSC instruction can return a time stamp to the processor unit 4, thus, the first system time, hereinafter can be obtained. The format of the first system time may be 00:00:00:00, such as, 10:01:10:10 which means 10 hour, 1 minute, 10 seconds, 10 milliseconds.

In step S20, the encryption module 231 encrypts the first system time and the CTL_CODE used by the application 22 using a predetermined encryption method, to generate an encrypted CTL_CODE, and sends the encrypted CTL_CODE to the driver program 24. The predetermined encryption method may adopt XOR, XNOR, or any other suitable logical operation. In one example, if the CTL_CODE is 0001, and the first system time is 10:01:10:10, then, the encrypted CTL_CODE may be 100110100001.

In step S30, the decryption module 232 decrypts the encrypted CTL_CODE received by the driver program 24 using a corresponding decryption method, to obtain the first system time and the CTL_CODE in the encrypted CTL_CODE.

In step S40, the call module 230 obtains a current system time of the computing device 1 (the second system time, hereinafter) at the time that the driver program 24 receives the encrypted CTL_CODE. As mentioned, the call module 230 may call the driver program 24 to generate the RDTSC instruction to obtain the second system time.

In step S50, the determination module 233 compares the first system time and the second system time, and determines if a difference between the first system time and the second system time falls within a predetermined range. The predetermined range may be 0 to 0.1 second, for example. It may be understood that, the CTL_CODE cannot be intercepted using the Dynamic Link Library (DLL) injection within 0.1 second. Step S60 is implemented if the difference between the first system time and the second system time falls within the predetermined range, and step S70 is implemented if the difference between the first system time and the second system time falls outside the predetermined range.

In step S60, the control module 234 allows the application 22 to access the driver program 24 by using the CTL_CODE, and in step S70, the control module 234 forbids the application 22 to access the driver program 24 by using the CTL_CODE.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for controlling access to driver programs being performed by execution of computerized code by a processor of a computing device, comprising:
    obtaining a first system time of the computing device at the time that an application uses a CTL_CODE to access a driver program;
    encrypting the first system time and the CTL_CODE to generate an encrypted CTL_CODE, and sending the encrypted CTL_CODE to a driver program;
    decrypting the encrypted CTL_CODE received by the driver program to obtain the first system time and the CTL_CODE;
    obtaining a second system time of the computing device at the time that the driver program receives the encrypted CTL_CODE;
    determining if a difference between the first system time and the second system time falls within a predetermined range; and
    allowing the application to access the driver program by using the CTL_CODE when the difference falls within the predetermined range, and forbidding the application to access the driver program by using the CTL_CODE when the difference falls outside the predetermined range.

2. The method according to claim 1, wherein the first system time is obtained by generating a read time stamp counter (RDTSC) instruction by the application.

3. The method according to claim 1, wherein the second system time is obtained by generating a read time stamp counter (RDTSC) instruction by the driver program.

4. The method according to claim 1, wherein the formats of the first system time and the second system time are 00:00:00:00.

5. The method according to claim 1, wherein encrypting the first system time and the CTL_CODE adopts XOR or XNOR logical operation.

6. The method according to claim 1, wherein the predetermined range is 0 to 0.1 seconds.

7. A computing device, comprising:
    a non-transitory storage medium;
    at least one processing unit; and
    one or more modules that are stored in the non-transitory storage medium; and are executed by the at least one processing unit, the one or more modules comprising instructions to:
    obtain a first system time of the computing device at the time that an application uses a CTL_CODE to access a driver program;
    encrypt the first system time and the CTL_CODE to generate an encrypted CTL_CODE, and send the encrypted CTL_CODE to a driver program;
    decrypt the encrypted CTL_CODE received by the driver program to obtain the first system time and the CTL_CODE;
    obtain a second system time of the computing device at the time that the driver program receives the encrypted CTL_CODE;
    determine if a difference between the first system time and the second system time falls within a predetermined range; and
    allow the application to access the driver program by using the CTL_CODE when the difference falls within the predetermined range, and forbid the application to access the driver program by using the CTL_CODE when the difference falls outside the predetermined range.

8. The computing device according to claim 7, wherein the first system time is obtained by generating a read time stamp counter (RDTSC) instruction by the application.

9. The computing device according to claim 7, wherein the second system time is obtained by generating a read time stamp counter (RDTSC) instruction by the driver program.

10. The computing device according to claim 7, wherein the formats of the first system time and the second system time are 00:00:00:00.

11. The computing device according to claim 7, wherein encrypting the first system time and the CTL_CODE adopts XOR or XNOR logical operation.

12. The computing device according to claim 7, wherein the predetermined range is 0 to 0.1 seconds.

13. A non-transitory storage medium having stored thereon instructions that, when executed by a processor of a computing device, causes the processor to perform a method for controlling access to driver programs, wherein the method comprises:
    obtaining a first system time of the computing device at the time that an application uses a CTL_CODE to access a driver program;
    encrypting the first system time and the CTL_CODE to generate an encrypted CTL_CODE, and sending the encrypted CTL_CODE to a driver program;
    decrypting the encrypted CTL_CODE received by the driver program to obtain the first system time and the CTL_CODE;
    obtaining a second system time of the computing device at the time that the driver program receives the encrypted CTL_CODE;
    determining if a difference between the first system time and the second system time falls within a predetermined range; and
    allowing the application to access the driver program by using the CTL_CODE when the difference falls within the predetermined range, and forbidding the application to access the driver program by using the CTL_CODE when the difference falls outside the predetermined range.

14. The storage medium according to claim 13, wherein the first system time is obtained by generating a read time stamp counter (RDTSC) instruction by the application.

15. The storage medium according to claim 13, wherein the second system time is obtained by generating a read time stamp counter (RDTSC) instruction by the driver program.

16. The storage medium according to claim 13, wherein the formats of the first system time and the second system time are 00:00:00:00.

17. The storage medium according to claim 13, wherein encrypting the first system time and the CTL_CODE adopts XOR or XNOR logical operation.

18. The storage medium according to claim 13, wherein the predetermined range is 0 to 0.1 seconds.

* * * * *